United States Patent [19]

da Silva

[11] 4,423,413
[45] Dec. 27, 1983

[54] RADIOCOMMUNICATION SYSTEM IN WHICH A RECEIVING STATION MONITORS A NUMBER OF TRANSMITTERS BY TIME DIVISION

[75] Inventor: Herman da Silva, Voorburg, Netherlands

[73] Assignee: Staat der Nederlanden (Staatsbedrijf der Posterijen, Telegrafie en Telefonie), The Hague, Netherlands

[21] Appl. No.: 276,021

[22] Filed: Jun. 22, 1981

[30] Foreign Application Priority Data

Jun. 30, 1980 [NL] Netherlands ................ 8003783

[51] Int. Cl.³ .................... H04Q 9/00; H04J 3/12; H04B 7/02
[52] U.S. Cl. .................... 340/825.03; 340/825.52; 340/825.21; 455/62; 455/32
[58] Field of Search .............. 340/825.21, 825.52, 340/825.03; 455/32, 161, 179, 62

[56] References Cited

U.S. PATENT DOCUMENTS

| | | | |
|---|---|---|---|
| 3,541,449 | 11/1970 | Broderick et al. | 455/62 |
| 4,013,958 | 3/1977 | Spayth | 455/32 |
| 4,155,040 | 5/1979 | Harmon et al. | 455/62 |
| 4,276,654 | 6/1981 | Nations et al. | 455/161 |
| 4,328,581 | 5/1982 | Harmon et al. | 455/62 |

*Primary Examiner*—Donald J. Yusko
*Attorney, Agent, or Firm*—Hugh Adam Kirk

[57] ABSTRACT

System for transmitting, via radiocommunication channels, call messages as specified in CCIR Recommendation 493-1. The transmitter transmits every call message, having a duration t, n times with a message frequency r. The receiving station, designed for monitoring calling stations by time division has a monitoring period $T=(n-1)/(n+1)\cdot t/r$ per station to be monitored. Only one receiver is used. The identification signal of the called station will always be recognized during one of the monitoring periods T, after which the monitoring period can be prolonged, if necessary.

3 Claims, 7 Drawing Figures

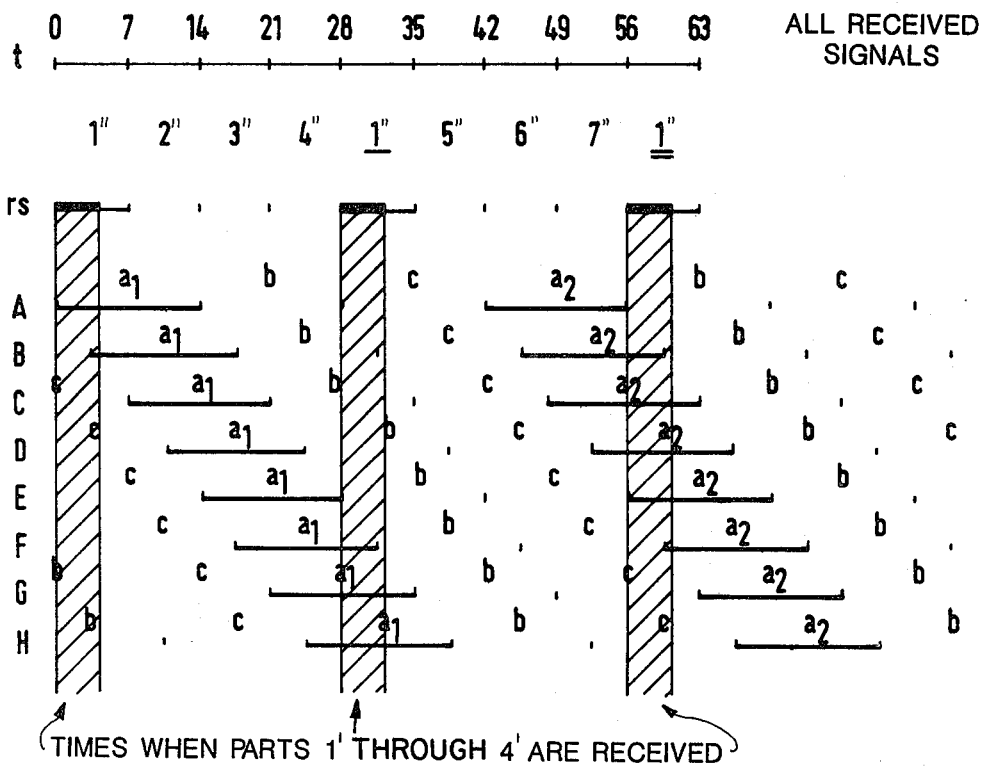
FIG. 4 ALL RECEIVED SIGNALS
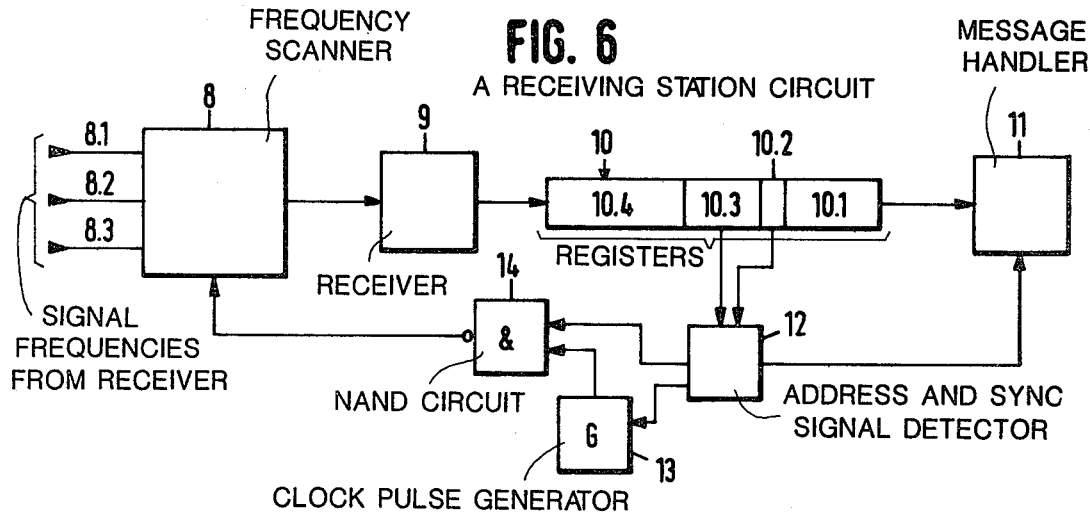
FIG. 6 A RECEIVING STATION CIRCUIT

A CALLING STATION CIRCUIT

TIME DIAGRAM OF FIG.5A

| t | 5 | 6 | 1.1 | 1.2 | 1.3 | 1.4 | 1.5 | 1.6 | 1.7 | 1.8 | 2.1 | 2.2 | 2.3 | 7 |
|---|---|---|---|---|---|---|---|---|---|---|---|---|---|---|
|   |   | 1 2 | T | T | T | T | T | T | T | T | T | T | T | T |
| 0 | → | ← | h | g | f | e | d | c | b | a | a |   |   |   |
| 1 | → |   |   | h | g | f | e | d | c | b | b | a |   |   |
| 2 | → |   |   |   | h | g | f | e | d | c | c | b | a |   |
| 3 | → | → |   |   |   | h | g | f | e | d | a | c | b | a |
| 4 | → |   |   |   |   | h | g | f | e | d | b | a | c | b |
| 5 | → |   |   |   |   | h | g | f | e | d | c | b | a | c |
| 6 | → |   |   |   |   | h | g | f | e | d | a | c | b | <u>a</u> |
| 7 | → |   |   |   |   | h | g | f | e | d | b | a | c | b |
| 8 | → |   |   |   |   | h | g | f | e | d | c | b | a | c |
| 9 | → | ← |   |   |   |   | h | g | f | e | d | c | b | <u>a</u> |
| 10 | → |   |   |   |   |   |   | h | g | f | e | d | c | b |
| 11 | → |   |   |   |   |   |   |   | h | g | f | e | d | c |
| 12 | → | → |   |   |   |   |   |   |   | h | g | f | e | d |

RADIOCOMMUNICATION SYSTEM IN WHICH A RECEIVING STATION MONITORS A NUMBER OF TRANSMITTERS BY TIME DIVISION

BACKGROUND OF THE INVENTION

The invention relates to a radiocommunication system, in which a number of calling stations can simultaneously transmit a number of call messages for a number of receiving stations, said call messages containing at least an address code for a receiving station, and in which the receiving stations comprise means for recognizing their address code.

A system of this is generally known, such as disclosed in assignee's U.S. Pat. No. 4,276,653 issued June 30, 1981, of which the present invention is an improvement. The procedure by which such systems work is mainly described in CCIR Recommendation 493-1.

With a larger number of calling stations the problem arises that a receiving station can easily miss a call addressed to it, because it can monitor only one frequency band at a time. Another problem is that the calling stations do not operate synchronously.

SUMMARY OF THE INVENTION

The object of this invention is to provide a solution for said problems. In this solution the calling station repeats a cell message for a receiving station a number of times, and the receiving station monitors a number of radio channels by time division, within the framework of the system specified by said CCIR Recommendation. Thus the relatively expensive solution of simultaneously monitoring a number of frequencies is avoided. Therefore the system according to the invention is characterized in that the calling station comprises means for transmitting the call message, having a duration t, n times with a message repetition frequency r, and that the receiving station comprises means for monitoring, by time division, the different calling frequencies of n calling stations, each for a period of $T = (n-1)/(n+1) \cdot t/r$.

Further the receiving station comprises means for prolonging the monitoring period, on reception of a fixed word synchronization pattern, until at least the signals containing the called station identification have been received and recognized. Thus, according to the invention, a simple and economically attractive message scanning system is obtained, which is applicable within the framework of the procedure specified in CCIR Recommendation 493-1.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 4 is a time diagram representing the relation between the reception of all the transmitted telecommunication signals and the monitoring periods at a receiving station for said signals;

FIG. 6 represents a schematic block wiring diagram of an embodiment of a part of the receiving station in the system according to this invention.

DETAILED DESCRIPTION OF A PREFERRED EMBODIMENT

Figure 1:
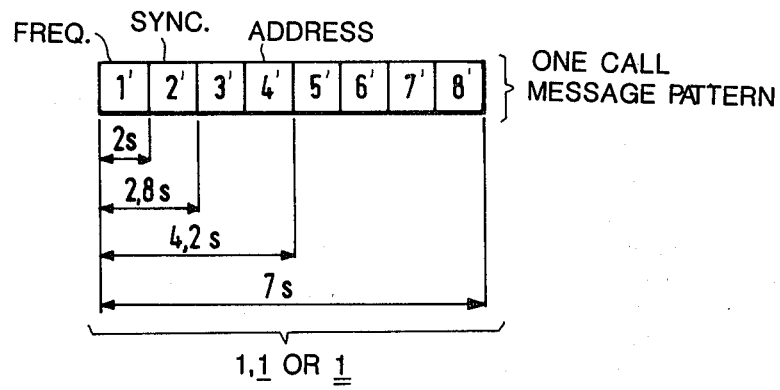
FIG. 1 represents a time diagram of a call message pattern as is used in the system according to this invention.

FIG. 1 illustrates the format of a call message. In the maritime mobile service such a call message is used to alert ships to the fact that the calling station has a message for some called station. This call message functions as a preliminary to the communication.

According to the CCIR Recommendation, the call sequence consists of eight parts: Part 1', having a duration of about 2 s (two seconds), contains information for adjusting the frequency of the scanner in the receiving station. Part 2', having a duration of 0.8 s (eight-tenths of a second), contains a fixed pattern for effecting bit and signal synchronization. Part 4, the transmission of which is completed 4.2 s (four and two-tenths seconds) after the beginning of the call sequence, contains the address information of the called station. The other parts 3', 5', 6', 7' and 8' are described in the above mentioned CCIR Recommendation 493-1, but are irrelevant for a good understanding of the invention and will be left out of consideration.

Figure 2:
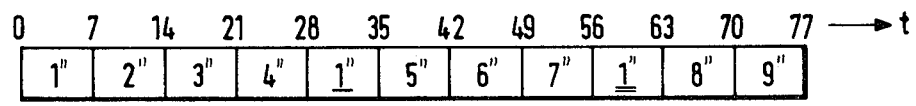
FIG. 2 represents a time diagram of pattern of messages as can be transmitted by a calling station in the system according to this invention including three equally spaced call messages as shown in FIG. 1 for one station 1"

It is usual that an information sending station regularly transmits the sequence of call messages for ships in the shape of a "burst". FIG. 2 shows a possible format of such a burst, in which, according to this invention, the first message 1" for a first receiving station is transmitted n times, which in the given example is three times. The first and the second repetitions are designated by $\underline{1}''$ and $\underline{\underline{1}}''$, respectively. The messages 2" through 9" are intended for other stations.

The repetition frequency r in the example is 1/4, i.e. a particular word is transmitted once in four words. The repetition frequency is determined by the propagation time ($d_1$) (see FIG. 3) between the calling station (ISS) and the receiving station (IRS), the processing time in the receiving station ($d_2$) and, the propagation time ($d_3$) between the receiving station IRS and the calling station ISS. If the message (BQ) sent back by the receiving station, like the call message, takes 7 s (seven seconds), the repeated transmission of the call message 1" (see FIG. 2) can only take place after $(2 \times 7 + d_1 + d_2 + d_3)$s. The repetition frequency r is determined by this delay. As will be shown hereinafter, a receiving station tuned to the frequency of the calling station is bound to have received the message 1" after at most n transmissions. If no acknowledgment is received, the receiving station will be considered (temporarily) unobtainable.

FIG. 4 shows that a call message transmitted n times will be detected by a scanner (n=3) in each of the intervals A through H. The transmitter has a repetition frequency r=1/4, so that, according to the invention, the scanning period must be $$T = \frac{n-1}{n+1} \cdot \frac{t}{r} = \frac{2}{4} \cdot \frac{7}{\frac{1}{4}} = 14s$$

in this example.

Figure 3:
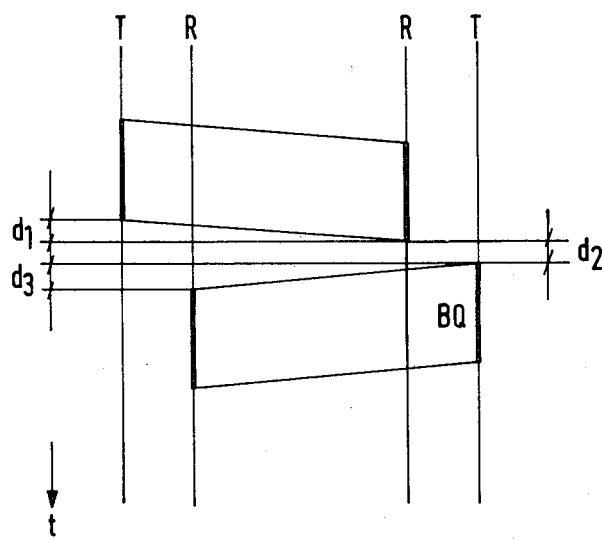
FIG. 3 is a time diagram representing the time delay period between telecommunication signals exchanged between a calling and a receiving station.

FIG. 4 is a time diagram for several different phase conditions A through H between scanner and received signal. As can be seen from this figure, a message having a format according to FIG. 1 will be detected by the receiving station to which it is addressed, even if the call messages received and the scanner are not synchronous. The line t is a time scale marked in seconds; rs represents the burst received, in which the message 1" from station a is repeated twice. It is obvious that this repetition can be dispensed with, as soon as the calling station has received the acknowledgment BQ (FIG. 3). The first 4.2 s (four and two-tenths seconds) part of each message 1" on line rs is drawn in fat line and provided with a downward hatched column. The horizontal lines $a_1$ and $a_2$ from A through H represent eight possible receiving station monitoring times or scanner positions for tuning to the transmitting station.

A first calling station is monitored during the period a, a second during the period b, and a third during the period c. It can be seen that, though the call messages and the scanning periods are not synchronous, one of the three call messages 1" entirely falls within a scanning period for the calling station a, as far as the phase conditions A, C, D, E, G and H are concerned. Only the call messages in B and F will missed, if no special measures are taken. According to the invention these measures consist in that the scanner stops as soon as the word synchronization signal (2' in FIG. 1) has been received completely and remains stopped till the message has finished.

FIG. 4 shows that, whatever the phase relation (A-H) between the received signals rs and the monitoring periods ($a_1$ and $a_2$) may be, the synchronous part 2' of the first 2.8 seconds of one of the three call message signals rs will always be recognized.

Figures 5A, 5B:
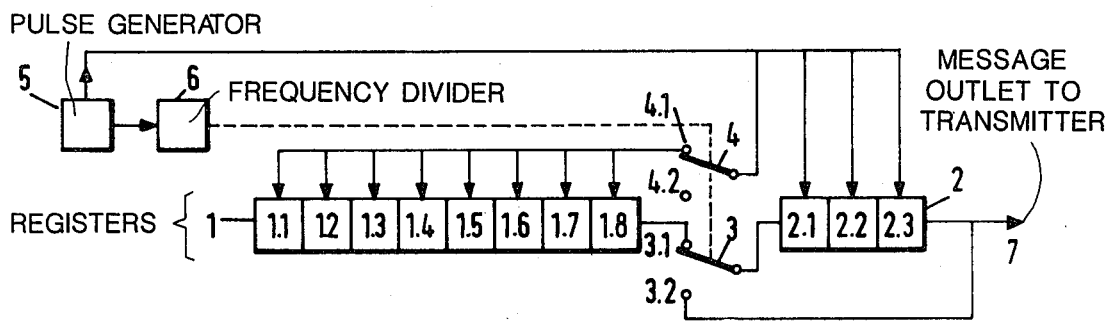
FIG. 5A represents a schematic block wiring diagram of an embodiment of a part of the calling station in the system according to this invention.
FIG. 5B is a time diagram indicating the working of the circuit shown in FIG. 5A.

FIG. 5A represents an embodiment of a part of the calling station ISS. It comprises a register 1, in which call messages to be transmitted are recorded, and a store or register 2 having 1/r rows; in the embodiment shown $r=1/3$ and $n=3$. Further a switch 3 has been provided to connect the input of store 2 to either the output of register 1 or the output of store or register 2 itself. A switch 4 is actuated synchronously with switch 3, in order to or not to cause register 1 to make a step. A generator 5 delivers one pulse in 7 s (seven seconds) and a frequency divider 6 having dividing factors 3 and 6 actuates the switches 3 and 4. The working of the device is illustrated by the time diagram of FIG. 5B, in which the messages are designated by letters a through h.

The working of the device according to FIG. 5A is as follows: During the interval $t_o$ (FIG. 5B; t) generator 5 delivers a first pulse, the frequency divider 6 puts the switches 3 and 4 in the positions 3.1 and 4.1, respectively, and, in consequence, the first call message a is written at 2.1 in store 2. At the instants $t_1$ and $t_2$, the messages b and c are also written in store 2. At the instant $t_3$, the frequency divider 6 puts the switches 3 and 4 in the positions 3.2 and 4.2, respectively. Now the message a appears at output 7, the clock pulses from generator 5 are no longer led to register 1, and the messages at output 7 are fed back to the first position 2.1 in store 2. Thus every message appears three times at the output 7, which is connected to the transmitter.

FIG. 6 represents an embodiment of a part of the receiving station in the system according to this invention. A scanner 8 scans—at three frequencies—signals supplied via input terminals 8.1-8.3. The scanned signal is led via a receiver 9 to a register 10. If the address in a call message (FIG. 1; 4') corresponds to the address of the receiving station, the message is led to a message handler 11. The address recognition takes place in a section 10.3 of register 10 by means of a detector 12, which controls the message handler 11 too. Another object of the detector 12 consists in reading a section 10.2 for detecting word synchronization signals. When such signals are found, the scanner 8 is temporarily prevented from stepping onwards via a NAND-circuit 14, which, under normal circumstances, passes the clock pulse from a generator 13 to the scanner. According to the invention, generator 13 delivers a pulse every T seconds. For the control of the receiving station according to FIG. 6 in co-operation with the calling station according to FIG. 5A, where $n=3$ and $r=1/3$, T equals $(n-1)/(n+1) \cdot t/r = 10.5$ s (ten and a half seconds). Further the detector 12 can be connected to the generator 13 to make it start a new scanning period T after the prolongation of the preceding one. This provides the greatest possible certainty that a next call message originating from another calling station will be recognized.

While there is described above the principles of this invention in connection with specific apparatus, it is to be clearly understood that this description is made only by way of an example and not as a limitation to the scope of this invention.

I claim:

1. In a radiocommunication system having a plurality of calling stations and at least one receiving station, and said calling stations having means for transmitting call messages on different frequencies, one corresponding to each calling station for a called receiving station, each of said call messages containing at least an address code for a receiving station, and said receiving station having means for recognizing its address code, the improvement comprising: means in each said calling station for transmitting a call message having a duration t for n times with a call message repetition frequency r, and means in each said receiving station for monitoring, by time division, the different calling frequencies of n calling station, each for a period $T=(n-1)/(n+1) \cdot t/r$.

2. System according to claim 1, in which the call messages contain a fixed word synchronization pattern, characterized by means for prolonging the monitoring period T after the recognition of the fixed pattern, until the address code has been received and recognized.

3. In a radio telecommunication system having a plurality of calling stations, each transmitting radio signals on a different frequency corresponding to that station, and at least one receiving station, said receiving station having its own address which can be transmitted by each calling station in a call message on one of said known different frequencies; the improvement comprising:

(1) means at each station for transmitting a call message on its corresponding frequency at least three times at equally spaced intervals, which intervals are at least twice as long as the duration of said call message, (2) means at said receiving station for scanning a plurality of said known different calling frequencies sequentially at least twice, each scanning being for a time at least as long as the duration of the address in said call message, and (3) means for stopping said scanning at said called receiving station when that called receiving station has detected its own address during one of its scanning operations.

* * * * *

UNITED STATES PATENT AND TRADEMARK OFFICE
CERTIFICATE OF CORRECTION

PATENT NO. : 4,423,413
DATED : December 27, 1983
INVENTOR(S) : Herman da Silva

It is certified that error appears in the above–identified patent and that said Letters Patent are hereby corrected as shown below:

In the Abstract, line 6, before "calling" insert - - n - -.

Column 1, line 29, change "cell" to - - call - - .

Column 2, line 30, change "4" to - - 4' - - .

Signed and Sealed this

Twenty-second Day of May 1984

[SEAL]

Attest:

GERALD J. MOSSINGHOFF

Attesting Officer

Commissioner of Patents and Trademarks